United States Patent [19]

Feichtinger

[11] Patent Number: 5,169,577
[45] Date of Patent: Dec. 8, 1992

[54] MOLDING A COMPONENT BY BLOWING POWDER INTO A POROUS MOLD

[75] Inventor: Heinrich Feichtinger, Hinteregg, Switzerland

[73] Assignee: Asea Brown Boveri Ltd., Baden, Switzerland

[21] Appl. No.: 666,892

[22] Filed: Mar. 8, 1991

[30] Foreign Application Priority Data

Mar. 14, 1990 [CH] Switzerland ............... 816/90

[51] Int. Cl.$^5$ ............ B27N 1/00; B29C 43/22; B29C 59/00
[52] U.S. Cl. .................. 264/56; 264/57; 264/517; 264/121; 419/38
[58] Field of Search ........... 264/121, 57, 56, 517, 264/81, 86, 87; 419/1, 38

[56] References Cited

U.S. PATENT DOCUMENTS

| | | | |
|---|---|---|---|
| 4,056,589 | 11/1977 | Lingscheit | 264/65 |
| 4,473,526 | 9/1984 | Bühler et al. | 264/121 |
| 4,683,118 | 7/1987 | Hayashi et al. | 264/121 |

Primary Examiner—James Lowe
Assistant Examiner—Christopher A. Fiorilla
Attorney, Agent, or Firm—Burns, Doane, Swecker & Mathis

[57] ABSTRACT

A process for the production of a complex component made of metal, ceramic or plastic, in which process powder (7) is blown by means of a transport gas into a gas-permeable negative mold (14), which is under reduced pressure and is located in a container (11), and pre-compacted, after which the negative mold (14) is removed from the container (11) and the green compact is sintered, either in a separate ceramic supporting composition or in the negative mold (14) itself, which consists of ceramic. The process allows production of a hollow body or of a layered body as the component by programming the powder injection.

17 Claims, 4 Drawing Sheets

MOLDING A COMPONENT BY BLOWING POWDER INTO A POROUS MOLD

BACKGROUND OF THE INVENTION

1. Field of the Invention

The invention relates to production of complex components from metallic or ceramic materials wherein powders are used as the starting material.

The invention relates to the further development, perfection and simplification of powder-metallurgical production methods for the production of workpieces of comparatively complex shapes, where the problems of shrinkage during sintering play an important role. The field of application is, in particular, the component sector in turbine construction.

In the narrower sense, the invention relates to a process for the production of a component of arbitrarily complex shape from a metallic or ceramic material or a plastic by production of a dense-packed molding using a pourable powder or a powder mixture as the starting material, by blowing the powder, fluidized by a transport gas, into a negative mold which is under reduced pressure and further treatment of the pre-compacted body, by subjecting the body to a sintering process. The invention also relates to an installation for carrying out the process.

2. Discussion of Background

Powders are used as the starting materials in numerous production methods in the metallurgical and ceramics industry. The intention is to produce workpieces by powder metallurgy as finished articles in order to be able to save on some or all expensive machining costs. The starting materials in all of the known processes for obtaining net shapes or near-net shapes of the workpieces are slurries (slip, paste) of powders in solvents using a binder. The following are used as additives to powder mixtures:
water+binder+additive (slip casting, freeze drying)
water+cellulose (metal-powder injection molding (MIM) by the Rivers process)
thermoplastics (metal-powder injection molding).

With all of these wet-mechanical methods numerous difficulties arise with regard to quality, freedom of shaping, reproducibility and choice of the composition:
bubble formation when mixing powder with binder and solvent.
Restriction of the wall thickness of the workpieces (for example max. 5–10 mm for "MIM"), since otherwise the binder can no longer be completely removed.
The occurrence of binder residues (for example carbon), which, even after "burning out" the binder, remain behind in the workpiece and can impair its composition in an uncontrolled manner.
The necessity for fresh selection/fresh development of the binder when changing to other shapes and/or compositions of the workpieces.

In the case of metal injection molding (MIM) a mixture of the metal powder to be compacted is injected into a mold together with a suitable thermoplastic in accordance with the injection molding technology. A summary of the methods for "Metal Injection Molding" is given in a chapter of the Metals Handbook.

A particular problem with this technology is, on the one hand, the fact that in general considerably finer powders have to be employed than is usually the case in powder metallurgy; on the other hand, the organic binder must be removed by a laborious process before the actual sintering process, which leads to a considerable increase in the cost of the process.

The vacuum-molding process, which serves for the production of casting molds from refractory granular mold material, as a rule quartz sand, is known from casting technology. By evacuation of the air from a heap of binder-free sand surrounded by sheeting, a reduced pressure is generated in said sand, as a result of which a compressive pressure is exerted by the adjacent outside gas atmosphere via the sheeting on the sand fill. The compressive strains caused by this means between the grains prevent the mutual mobility of the latter, as a result of which a mechanically strong body of defined shape is formed from a loose heap.

In the production of moldings which are subjected to a subsequent sintering, the uniformity of the powder fill at all points of the molding is extremely important since the local extent of shrinkage, and thus the dimensional accuracy, are a function of the local settled apparent density.

There are processes from the field of powder metallurgy where mixtures of a metal powder with a liquefied organic phase are injected into molds by the injection molding process. After the filling operation, a compact composite of uniform density is formed, from which the organic binder must be removed before the actual sintering process starts.

There are other processes in which essentially dry powder is filled into a mold under vacuum. This operation can, for example, also be supported by a suitable vibration or shaking operation. However, because of the frictional resistance of the powder, there are limits to the complexity of shaping, or there is a risk that the various grain fractions of a powder will demix under the influence of the movement of the powder, especially under the action of vibrations, as a result of which an inhomogeneous sintered compact forms.

With the aid of one process, for example, a molding is produced by a procedure in which a pourable molding composition is fluidized using a transport gas and in this way passes into the interior of a mold which is under reduced pressure and which contains suction orifices at certain points for drawing off the transport gas. A substantial part of the description of this process is dedicated to the optimum sizing and arrangement of these suction orifices and to the optimum timing of the injection and suction processes, since both the geometrical arrangement and the timing are of extremely great importance for the production of a molding having a uniform settled apparent density. When the fluidized powder penetrates into the interior of the mold expansion of the gas, and thus kinetic acceleration of the powder particles, occurs, which powder particles are driven by centrifugal force against the wall of the mold. Since, however, the wall of the mold is impermeable to gas in substantial sections, only a coating of the wall is achieved by the kinetic energy of the grain particles. Special precautions must, in particular, be taken in order to prevent premature blocking of the off-gas channels by powder preferentially flying in this direction.

The following publications are cited in respect of the prior art:
GB Pat. Appl. 2088414
EP Pat. Appl. 0191409
DE-A-3,101,236
DE-A-3,128,347

DE-A-3,128,348
DE-A-3,542,332
R. Billet, "PLASTIC METALS: From Fiction to Reality with Injection Molded P/M Materials", Parmatech Corporation, San Rafael, Calif., P/M-82 in Europe Int. PM-Conf. Florence I 1982.
Göran Sjöberg, "Powder Casting and Metal Injection Molding", manuscript submitted to Metal Powder Report September 1987
Henry H. Hausner, "Slip Casting of Metal Powders", in "Perspectives in Powder Metallurgy", Hausner et al., Plenum Press 1967

The known processes leave something to be desired. There is therefore a need for improvement and further development of the powder-metallurgical/powder-ceramic production methods.

SUMMARY OF THE INVENTION

The object on which the invention is based is to indicate a process and an apparatus with which it is possible, using pourable metal or ceramic powders as starting materials, to produce a workpiece of comparatively complex shape and of any desired cross-section and unlimited wall thickness. With this process a green strength adequate for further processing should be achieved for the green compact. The process should provide a reproducible finished product which requires no further, or at most slight, additional machining. During powder processing, bubbles and undesirable harmful residues should be avoided. The process should ensure the maximum possible freedom and universality in respect of the choice of shape and of the composition of the workpiece to be produced.

This object is achieved in that the process mentioned initially consists of the following component steps:
introduction of a negative mold, which determines the shape of the component and consists of a porous material which is permeable to gas but not permeable to the powder, at least in the surface zone of the inner wall, into a container which is under reduced pressure, uniform gas flow conditions being provided for applying the powder to the inner wall by centrifugal force,
blowing the powder into the cavity of the negative mold using a transport gas which is under high pressure, a green strength which is adequate for the further treatment of the green compact being achieved,
flooding the container in order to produce pressure equalization in the negative mold, removing the negative mold together with the green compact from the container for further treatment, and
sintering the green compact.

The object is furthermore achieved in that the installation for carrying out the process consists of at least one storage vessel for the powder, which vessel is provided with a valve for the supply of the transport gas and a barrier element for blowing in the powder, a container, which is provided with a seal, is under reduced pressure and has an outlet valve, and a negative mold which is permeable to gas and is housed in said container.

To summarize, the following may be mentioned: the purpose of the invention is the production of moldings from pourable powders, which, after introduction into a mold, either achieve, by means of a binder phase, a green strength such that they can be released from the mold and fed to a sintering process, or which are subjected to a sintering process inside said mold itself, in which case the mold serves as back-support for the molding and must not enter into any reactions with the molding under the influence of the temperature and must be removable from the surface of the molding after conclusion of the sintering process. The powder from which the molding is built up can be a metal powder or a ceramic powder or a plastic powder; however, a mixture of at least two of the said components is also possible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
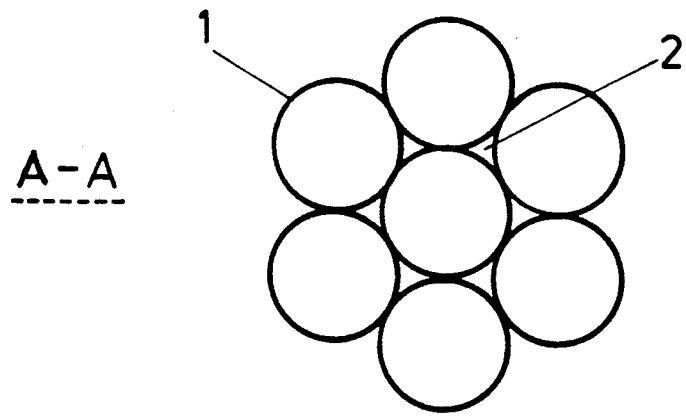
FIG. 1 shows a diagrammatic view (seen in the flow direction of the gas stream) of an idealized loose fill of globular powder particles (hexagonally densest spherical packing)

Referring now to the drawings, wherein like reference numerals designate identical or corresponding parts throughout the several views, in FIG. 1 a diagrammatic view (seen in the flow direction of the gas stream) is given of an idealized loose fill of globular powder particles (hexagonally densest spherical packing). 1 is an idealized globular powder particle in the densest loose fill (shown as a sphere for simplification). 2 is the open-pore space between adjacent powder particles (flow channel for gas stream).

Figure 2:
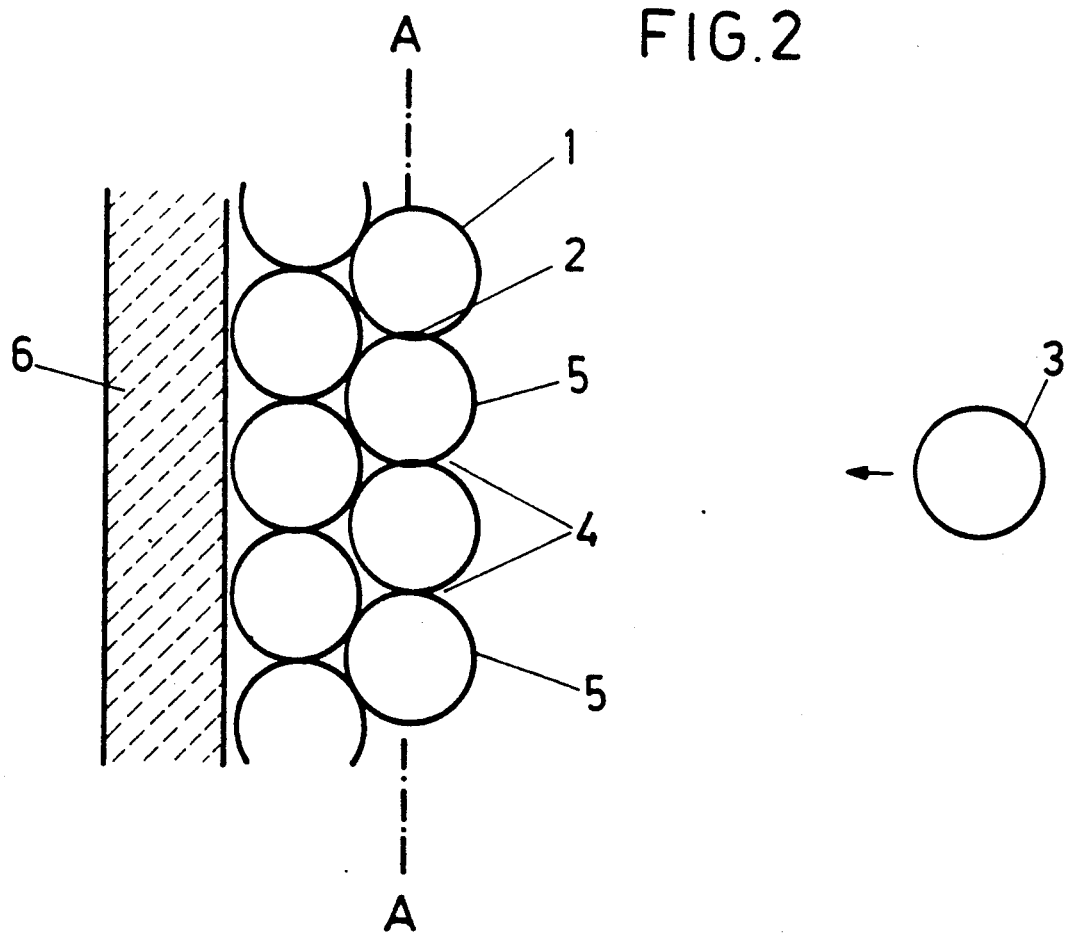
FIG. 2 shows an outline/section (seen vertically to the flow direction of the gas stream) of an idealized loose fill of globular powder particles (hexagonally densest spherical packing) at the wall of a negative mold.

FIG. 2 shows an outline/section (seen vertically to the flow direction of the gas stream) of an idealized loose fill of globular powder particles (hexagonally densest spherical packing) at the wall of a negative mold. The reference numerals 1 and 2 are identical to those in FIG. 1. 3 is a powder particle flying vertically toward the inner wall of the negative mold. 4 is the location of high speed and low pressure and 5 that of low speed and high pressure (stagnation point) established under the gas stream. 6 represents the gas-permeable wall of the porous (open-pore) negative mold.

In the process according to the invention, the entire wall 6 of the negative mold, consists of a gas-permeable porous material, the porosity, at least in the region of the inner surface of the mold, having a pore diameter which prevents the penetration of powder grains, even of the smallest size. Since the entire inner surface of the gas-permeable negative mold 6, which is under a reduced pressure and to which a reduced pressure is applied from the outside, is available for the gas transport, the fluidized powder (particles) can, in principle, reach any point of the mold 6. As a result a uniform coating operation is provided which is self-controlled in that points on the wall 6 which have been more thickly coated with powder have a higher flow resistance and, therefore, direct further fluidized powder to those points on the wall 6 where the coating thickness is not yet as great and, therefore, a lower flow resistance exists. As a result of the fact that the molding builds up from the fluidized gas/powder phase in layers from the wall 6 toward the center, a very dense packing is possible, since the individual impinging powder grains do not arrive in close association and thus are hindered in their residual mobility but still possess a certain lateral freedom of movement.

This operation is also supported by an aerodynamic phenomenon, which is shown diagrammatically in the flow direction in FIG. 1 and in the direction vertical thereto in FIG. 2. This representation should be considered in the sense of the simplified view with particles 1 in the shape of spheres of identical size. The observations made can, however, also be applied analogously to loose fills with spheres of different sizes or with bodies which deviate from the ideal spherical shape. If a gas stream flows through the densest spherical packing, the gas stream impinges on the surface of the loose fill at the open-pore spaces 2 in the loose fill, where three spheres butt against one another. At this flow channel there is a point 4 of increased speed and reduced pressure, whilst directly in front of the spheres a point 5 of low speed (stagnation point) exists. If a further sphere (powder particle 3) now flies against a loose fill of this type it will be deflected immediately before impinging on this loose fill into one of these flow channels and therefore purposefully arrives at a point which corresponds to the densest packing. As soon as it is in this position, it constitutes an obstacle to flow, i.e. the further spheres are automatically arranged alongside it by the flow field also influenced by it. This effect can occur only in the case of a loose fill through which the flow is vertical and which is supported at the back by a gas-permeable wall 6. If this wall has only a few gas outlets, this effect can not take place at all points in the mold where there is no gas permeability. Slower flow kinetics of the powder grains in the region of the wall 6 also result from the fact that, with the process according to the invention, the entire inner surface of the wall 6 is available for transporting away the fluidizing gas, since with this arrangement the flow can be distributed over a large surface and, thus, a reduced energy results on impact, as a result of which both the grain and the wall 6 are protected.

Figure 3:
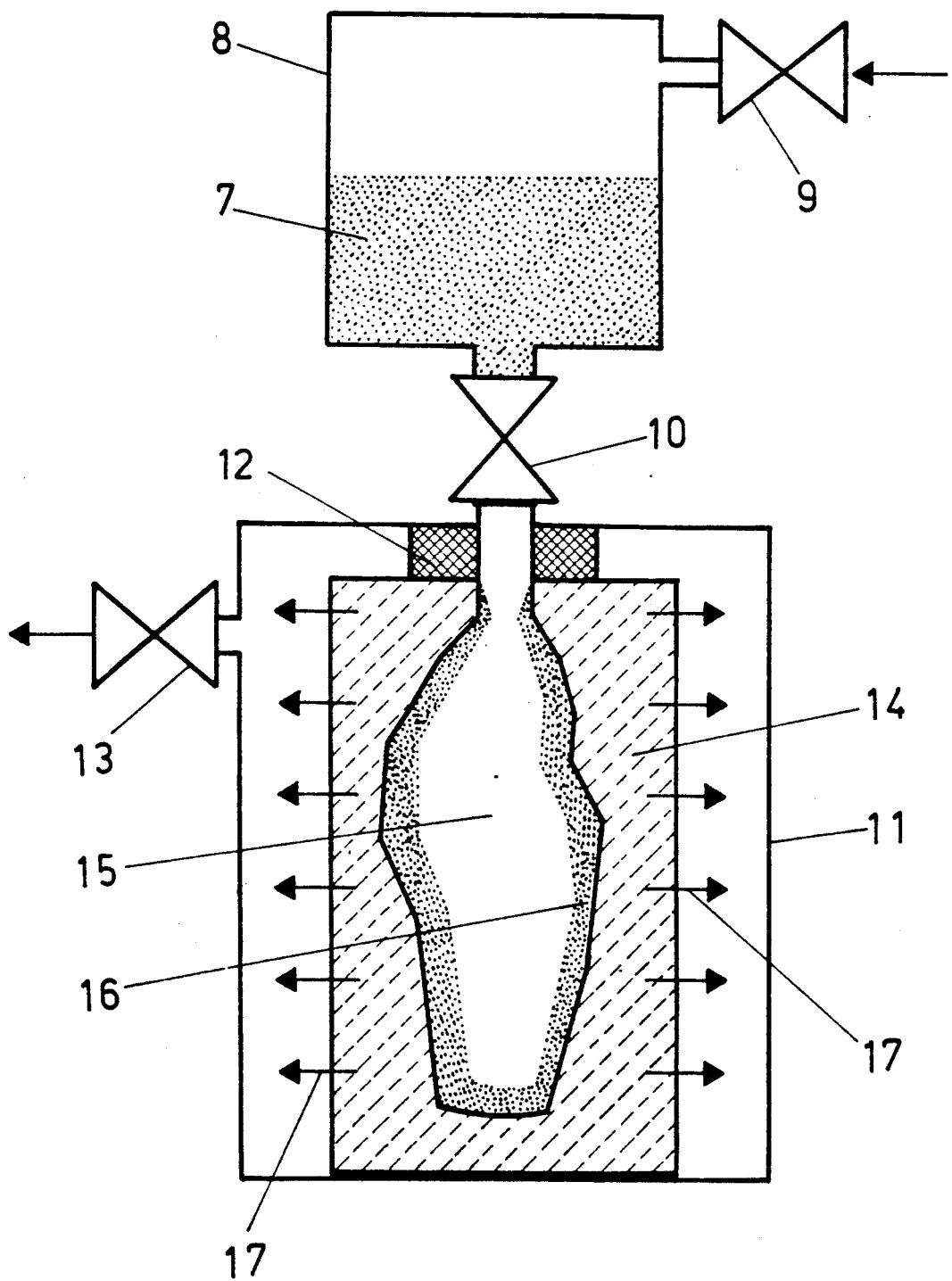
FIG. 3 shows an outline/section of an apparatus for carrying out the process, with partially filled negative mold.

FIG. 3 relates to an outline/section of an apparatus for carrying out the process, with a partially filled negative mold. 7 is the pourable powder (metal, ceramic or plastic) which is to be processed and which is located in the storage vessel 8 at the start of the process sequence. 9 is a valve for the supply of the transport gas required for fluidizing the powder 7. The storage vessel 8 is closed at the bottom by a barrier element 10 for the powder 7. This barrier element 10 consists of a valve, isolating valve or slide or of a bursting sheet, etc. A vessel 11, which is under reduced pressure, is connected, via an intermediate seal 12, to the barrier element 10. This vessel is provided with an outlet valve (vent valve 13), which is connected via a line to a vacuum pump (not shown). A gas-permeable divided or undivided negative mold 14, usually made of ceramic material, is located in the vessel 11. 15 is the cavity (inner space) of the negative mold 14. 16 represents the layer of powder applied by centrifugal force to the inner wall of the negative mold 14. The status at a given point after partial filling of the cavity 15 just after the start of the injection operation has been drawn. 17 is in each case a trajectory of the gas flow, shown as an arrow.

What is shown here is a diagram of the process according to the invention. The powder 7 is in a storage vessel 8, which is placed under gas pressure via the valve 9. Via a barrier element 10, which is not designated in more detail in the case under consideration and which, for example, can consist of an electromagnetic valve, the powder passes, after opening of said barrier element, into the interior space, which is under a reduced pressure, of a porous and gas-permeable mold 14, this mold, in turn, being located inside a reduced-pressure container 11, to which a vacuum can be applied via a suction line with valve 13. The mold 14 is sealed by means of a sealing element 12 against the inlet orifice of the reduced-pressure container 11 and the barrier element 10. The layer 16 corresponds to the status at a given point in time, as results immediately after opening the barrier element 10, where only a portion of the powder has entered the interior space of the mold and more or less uniformly covered the wall. However, this status also arises in a similar form if the amount of powder is smaller than that which corresponds to the internal volume of the mold, by which means a hollow body is formed.

Figure 4:
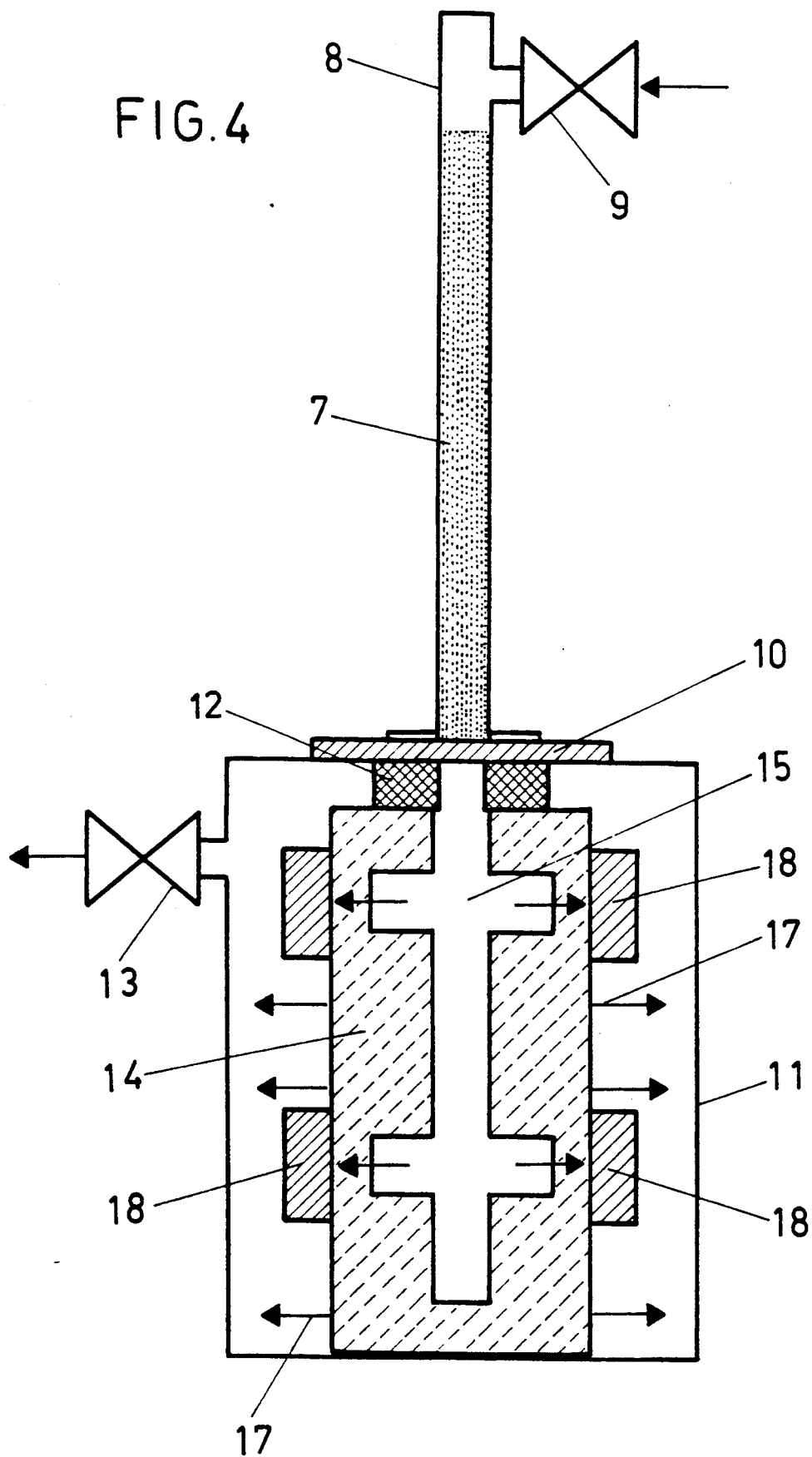
FIG. 4 shows an outline/section of an apparatus for carrying out the process, with bursting sheet and flow baffles on the negative mold, before blowing in the powder.

FIG. 4 shows an outline/section of an apparatus for carrying out the process, with bursting sheet and flow baffles on the negative mold, before blowing in the powder. The reference numerals 7 to 15 and 17 in principle correspond to those in FIG. 3, although certain elements of the installation have a deviating shape. In the case under consideration, the barrier element 10 for the powder 7 is designed as a flat, plane bursting sheet. The cavity 15 of the negative mold 14 has been drawn empty (status before blowing in the powder). Gas-tight flow baffles 18, which serve for additional control of the gas flow, are attached at certain points to the outer wall of the negative mold 14.

This figure corresponds to the example of one embodiment. The powder 7 is located in a cylindrical container 8, which, without substantial reduction in the cross-section, passes through the sealing element 12 to the inlet of the mold cavity 15. In the case under consideration, the barrier element 10 is designed as a film which is renewed before each injection operation and which bursts when a certain differential pressure is reached between the container 8 and the mold cavity 15, after which the powder, as a consequence of the feed channel which is designed without substantial loss of cross-section, suddenly enters into the mold cavity, where it is fluidized in all directions by the expansion of the gas located in the inter-grain volume. The figure also contains another construction variant, which by way of example, but not necessarily, must be combined with the design of storage vessel 8 and barrier element described above: if, in the case of molds having a high degree of complexity, the gas flow is to be preferentially directed to certain points within the mold cavity, say in the case of deep undercuts, flow baffles 18 can then be fitted on the outside of the mold as an obstacle to flow at those locations where a reduced flow out of the mold interior is locally desired.

Figure 5:
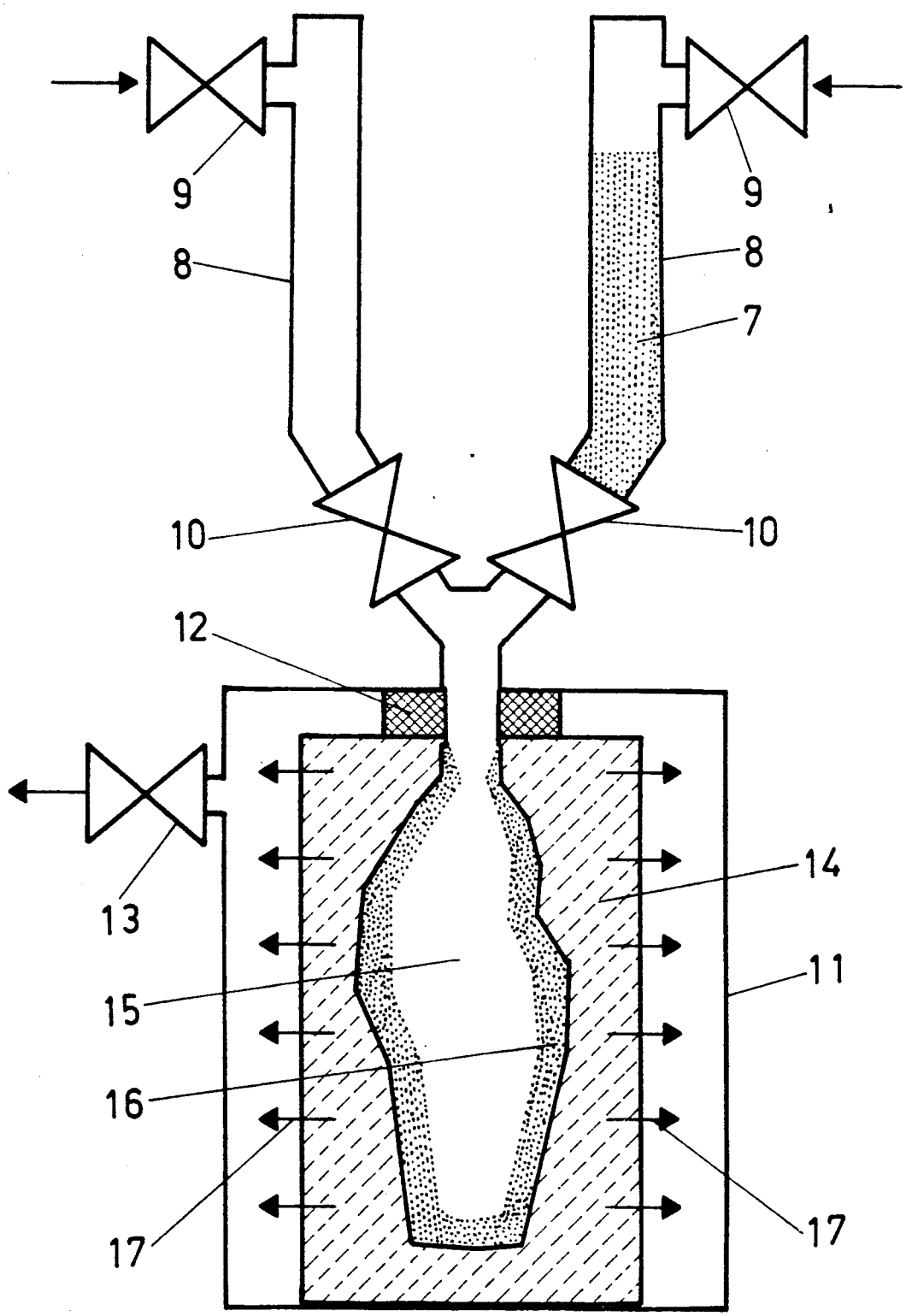
FIG. 5 shows an outline/section of an apparatus for carrying out the process, with several storage containers for different powders, for a partially filled negative mold.

FIG. 5 shows an outline/section of an apparatus for carrying out the process, with several storage vessels for different powders, for a partially filled negative mold. All reference numerals 7 to 17 correspond precisely to those in FIG. 3. In principle, the same point in time of partial powder filling of the cavity 15 of the negative mold 14 has been retained in this case also. In the case under consideration, however, several storage vessels 8 for different powders 7 are provided, including corresponding control elements. Accordingly, different powders can be injected into the cavity 15, simultaneously or successively or alternately in accordance with any desired program. It is also possible additionally to blow in only further transport gas, without powder, via one storage vessel 8, in order to influence the fluidization of the powder 7 originating from an adjacent storage vessel.

The figure shows a further example of an installation according to the invention, where several powders can be introduced successively into a mold. In the example under consideration, this will be described with two powders. In this example, a fine-grained and thus better dense-sintering metal powder is present in one storage vessel 8 (left), while a coarser metal powder of the same composition is present in the other storage vessel 8 (right), both vessels being connected, each via a barrier element 10 and via a common sealing element 12 to the inlet of the inner space 15 of the mold 14. After opening the first barrier element, the fine-grained powder first passes into the interior space where it forms the outer layer of the molding. After opening the second barrier element, the remainder of the molding is filled with the coarser powder. During the subsequent sintering operation, dense-sintering of the fine-grained surface takes place early, so that the molding can be post-compacted in a hot-isostatic process.

For the production of a turbine blade from a 13% chrome steel, a metal powder having a particle size of 20 to 70 μm was filled into a porous ceramic mold in an arrangement corresponding to FIG. 4. Household aluminum foil was used as the barrier element, the diameter of the outlet orifice of the storage vessel 8 being 12 mm. After the mold 14 located in the container 11 had been evacuated to a pressure of below 50 mbar, the pressure in the storage vessel 8 containing the powder was raised until, at 2.3 bar, the aluminum foil burst, at which point the interior space 15 was instantaneously filled. Parallel experiments which were carried out using the same powder in the same mold but with filling on a vibrating table, gave molding weights which were 3–5% lower.

The invention is not restricted to the illustrative embodiments corresponding to the figures.

The process for the production of a component of arbitrarily complex shape from a metallic or ceramic material or a plastic comprises the production of a dense-packed molding using a pourable powder 7 or a powder mixture as the starting material, by blowing the powder 7, fluidized by a transport gas, into a negative mold 14 which is under reduced pressure and further treatment of the pre-compacted body, by subjecting the body to a sintering process, and is arranged in the following component steps:

introduction of a negative mold 14, which determines the shape of the component and consists of a porous material which is permeable to gas but not permeable to the powder 7, at least in the surface zone of the inner wall, into a container 11 which is under reduced pressure, uniform gas flow conditions being provided for applying the powder to the inner wall by centrifugal force, blowing the powder 7 into the cavity 15 of the negative mold 14 using a transport gas which is under high pressure, a green strength which is adequate for the further treatment of the green compact being achieved, flooding the container 11 in order to produce pressure equalization in the negative mold 14, removing the negative mold 14 together with the green compact from the container 11 for further treatment, and sintering the green compact.

The process is carried out in that a divided negative mold 14 is used as permanent mold and the green compact, after pre-compaction, is removed from the negative mold 14, embedded in a ceramic supporting composition which maintains the shape of said compact and sintered in this supporting composition, or in that an undivided negative mold 14 made of a ceramic material is used, which negative mold serves as supporting composition during the further treatment of the green compact and is removed by destruction in the course of or after completion of the sintering process when the component has achieved an adequate strength.

The transport gas used is advantageously the same gas as is present in the container 11, in the dead space and in the inter-grain volume of the powder 7 before injection. According to a variant, separate transport gas is additionally injected during at least some of the period of injection of the powder 7, in order to increase the fluidity of the powder jet. According to a further variant, the amount of powder is metered such that it does not completely fill the entire internal volume 15 of the negative mold 14, such that the component produced is a hollow body.

For the production of a layered molding, powder 7 of various particle sizes, various particle size distributions and/or various particle shapes and/or various compositions is injected simultaneously or successively into the cavity 15 of the negative mold 14. In a special variant of the process, metal and/or ceramic and/or plastic powders are used simultaneously or successively.

The apparatus for carrying out the process consists of at least one storage vessel 8 for the powder, which vessel is provided with a valve 9 for the supply of the transport gas and a barrier element 10 for blowing in the powder 7, a container 11, which is provided with a seal 12, is under reduced pressure and has an outlet valve 13, and a negative mold 14 which is permeable to gas and is housed in said container 11. In a special development of the installation, the barrier element 10 of the storage vessel 8 consists of a bursting sheet and the gas-permeable negative mold 14 is provided on the outer wall, at the points which, because of the component to be produced, require a reduced gas flow, with gas-tight flow baffles 18.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the production of a component from a powder, comprising steps of:
   providing a mold having an interior cavity in the shape of a component to be manufactured, the mold being of porous gas permeable material at least throughout an inner wall of the mold defining the cavity, the mold being located inside a container maintained at a reduced pressure;
   injecting a quantity of powder into the cavity and forming a green compact, the powder being blown into the cavity by a pressurized transport gas and the powder being uniformly applied to the inner wall of the mold by flow of the transport gas into the porous material as a result of the reduced pressure in the container;
   equalizing pressures in the container and in the cavity of the mold;
   removing the mold and green compact from the container; and
   sintering the green compact.

2. The process of claim 1, wherein the cavity has a shape of a turbine blade.

3. The process of claim 1, wherein the powder comprises metal, ceramic or plastic material 4. The process of claim 1, wherein the powder is injected from a storage vessel into the cavity during the injecting step, the storage vessel being sealed from the reduced pressure in the container prior to the injecting step.

5. The process of claim 1, wherein the porous material has a porosity which prevents penetration of the powder into the porous material, the powder being in a dry and free flowing state during the injecting step.

6. The process of claim 1, wherein the entire mold is of the gas permeable porous material.

7. The process of claim 1, wherein the quantity of the powder is less than an amount necessary to completely fill the cavity and the green compact comprises a hollow body.

8. The process of claim 1, wherein the mold comprises a divided permanent mold and the process further comprises removing the green compact from the mold prior to the sintering step.

9. The process of claim 1, wherein the mold comprises a divided permanent old and the process further comprises removing the green compact from the mold prior to the sintering step and embedding the green compact in a ceramic supporting composition which maintains the shape of the green compact during the sintering step.

10. The process of claim 1, wherein the mold comprises an undivided ceramic material composition which serves as a supporting composition during the sintering step, the process further comprising destroying the undivided ceramic material composition during or after the sintering step.

11. The process of claim 1, wherein the transport gas is identical to a gas present in the container and surrounding the powder prior to the injecting step.

12. The process of claim 1, wherein the process further includes injecting another transport gas into the cavity during at least part of the injecting step to increase fluidity of the powder injected into the cavity.

13. The process of claim 1, wherein the powder is of various particle sizes, distributions, shapes and/or compositions injected simultaneously or successively into the molds so as to form a layered molding during the injecting step.

14. The process of claim 1, wherein a layered molding is formed during the injecting step by introducing metal, ceramic and/or plastic powder material simultaneously or successively into the cavity.

15. The process of claim 1, wherein the powder is injected into the cavity at ambient temperature.

16. The process of claim 1, wherein the powder builds up in a layer on the inner wall of the cavity and the layer becomes thicker towards a center of the cavity during the injecting step.

17. The process of claim 1, wherein the mold includes gas impermeable flow baffles arranged at points on an outer wall of the mold, the baffles reducing flow of the transport gas through portions of the mold located between the baffles and the cavity during the injecting step.

* * * * *